United States Patent [19]

Mascia et al.

[11] Patent Number: 5,386,005
[45] Date of Patent: Jan. 31, 1995

[54] PREPOLYMERS CONTAINING A PERFLUOROPOLYETHEREAL CHAIN AND CARBOXYLIC END GROUPS, SUITABLE AS CROSS-LINKING AGENTS FOR EPOXY PREPOLYMERS

[75] Inventors: Leno Mascia, Loughborough, Great Britain; Claudio Tonelli, Concorezzo; Giovanni Simeone, Milan, both of Italy

[73] Assignee: Ausimont S.p.A., Milan, Italy

[21] Appl. No.: 19,788

[22] Filed: Feb. 19, 1993

[30] Foreign Application Priority Data

Feb. 20, 1992 [IT] Italy .............. MI92 A 0361

[51] Int. Cl.6 .............. C08G 59/42; C08G 59/62
[52] U.S. Cl. .............. 528/110; 528/365; 528/401; 525/408; 525/523; 525/533
[58] Field of Search .............. 528/110, 401, 365; 525/508, 523, 533

[56] References Cited

U.S. PATENT DOCUMENTS

| | | | |
|---|---|---|---|
| 3,665,041 | 5/1972 | Sianesi et al. | 260/615 A |
| 3,810,874 | 5/1974 | Mitsch et al. | 260/75 H |
| 3,847,978 | 11/1974 | Sianesi et al. | 260/615 A |
| 4,816,545 | 3/1989 | Re et al. | 528/401 |
| 4,851,485 | 7/1989 | Re et al. | 528/112 |

FOREIGN PATENT DOCUMENTS

| | | |
|---|---|---|
| 0148482 | 7/1985 | European Pat. Off. . |
| 0151877 | 8/1985 | European Pat. Off. . |
| 0212319 | 3/1987 | European Pat. Off. . |
| 0271873 | 6/1988 | European Pat. Off. . |
| 903446 | 6/1972 | Italy . |
| 1309401 | 3/1973 | United Kingdom . |
| 1309402 | 3/1973 | United Kingdom . |

*Primary Examiner*—Frederick Krass
*Attorney, Agent, or Firm*—Bryan Cave

[57] ABSTRACT

The invention relates to two classes of prepolymers containing a perfluoropolyethereal chain and carboxylic end groups, suitable as cross-linking agents for epoxy prepolymers.

The first class contains anhydride-derived end groups; the second lactone-derived end groups; prepolymers therefrom are also disclosed. Additional non-fluorinated curing agents may also be added.

11 Claims, No Drawings

PREPOLYMERS CONTAINING A PERFLUOROPOLYETHEREAL CHAIN AND CARBOXYLIC END GROUPS, SUITABLE AS CROSS-LINKING AGENTS FOR EPOXY PREPOLYMERS

The present invention relates to fluorinated epoxy resins. More in particular it relates to new fluorinated cross-linking agents for epoxy prepolymers and to the new fluorinated epoxy resins prepared by using said agents.

European patent application No. 271,873 describes new fluorinated epoxy resins prepared by cross-linking of epoxy prepolymers containing perfluoroalkylene chains. European patent application No. 212,319 describes similar resins in which the epoxy prepolymers contains perfluoropolyethereal chains. These fluorinated resins are endowed with good surface properties, but their mechanical properties are poor.

It has now surprisingly been found that it is possible to prepare fluorinated epoxy resins exhibiting excellent mechanical properties along with very good surface properties as well as very good chemical and thermal stabilities if particular fluorinated prepolymers, which will be described hereinafter, are used as cross-linking agents of the conventional non-fluorinated epoxy prepolymers.

Thus, it is an object of the present invention to provide new prepolymers comprising a perfluoropolyethereal or fluoropolyethereal chain and carboxylic or carboxylic and hydroxylic end groups, suitable in particular for the cross-linking of epoxy prepolymers.

Another object is to provide new fluorinated epoxy resins endowed with the abovesaid combination of excellent properties.

The first of these objects is achieved by a first class of prepolymers comprising a perfluoropolyethereal or fluoropolyethereal chain and two functional end groups selected from two —COOH, or a —COOH and a —OH. These prepolymers correspond to the formula:

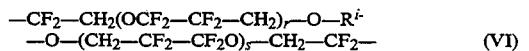

wherein: Q is a perfluoropolyethereal or fluoropolyethereal chain having an average molecular weight ranging from 500 to 10,000, selected from the group consisting of:

1)

$$-CF_2-O-(CF_2CF_2O)_m(CF_2O)_p-CF_2- \quad (V)$$

wherein units $(CF_2CF_2O)$ and $(CF_2O)$ are randomly distributed along the chain and m/p ranges from 0.2 to 2;

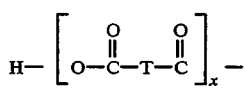

in which $R^1$ is a fluoroalkylene radical containing 1 to 10 carbon atoms and r/s ranges from 0.8 to 1.2;

3)

$$-CF_2-(CF_2-CFO)_t(CF_2CF_2O)_u(CFXO)_v-CF_2- \quad (VII)$$
$$\phantom{-CF_2-(CF_2-}|$$
$$\phantom{-CF_2-(CF_2-}CF_3$$

in which units

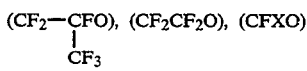

are randomly distributed along the chain;
X=F or $CF_3$;
t/u=0.6–2.0; u/v is higher than 10;

4)

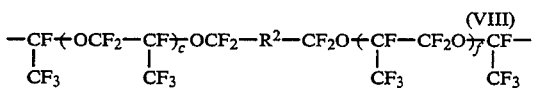

in which $R^2$ is a perfluoroalkylene radical containing 1 to 10 carbon atoms and c/f=0.8–1.2.

T is a divalent aliphatic, aromatic, cycloalkylene or cycloalkene hydrocarbon radical optionally containing chlorine atoms, derived from an anhydride of a bicarboxylic or tetracarboxylic acid;
n ranges from 0 to 5;
x and y, like or different from each other, are equal to 0 or 1 provided that x+y is equal to 1 or 2.

These prepolymers, which are new compounds, are prepared by reacting a perfluoropolyether or fluoropolyether diol of formula $$HO(CH_2CH_2O)_n-CH_2-Q-CH_2(OCH_2CH_2)_nOH \quad (I)$$

(in which Q and n are the same as defined hereinbefore) with one or more anhydrides of bicarboxylic or tetracarboxylic aliphatic, aromatic, cycloalkane or cycloalkene acids optionally containing chlorine atoms.

When one or more anhydrides are used, the prepolymers (XI) contain therefore radicals T of different meaning, corresponding to the radicals derived from the various anhydrides which have been utilized.

The reaction between the diol and the anhydride or anhydrides is usually conducted at temperatures ranging from 20° to 200° C., and preferably from 100° to 150°C.

The use of a solvent is optional. When a solvent is used, it is generally a solvent of perfluoropolyethers such as $CCl_2F-CClF_2$ or a mixture of such solvent with a ketone, for example acetone or methylethylketone, or with an ester, for example butyl acetate or amyl acetate.

The perfluoropolyethereal or fluoropolyethereal chain has preferably an average molecular weight ranging from 500 to 5,000.

When a radical T is aliphatic, it usually contains 4 to 18 carbon atoms. When it is cyclic, it usually contains 6 to 12 carbon atoms. The cyclic radicals T containing Cl atoms, derived from cyclic bicarboxylic acids generally have a high number of such atoms, corresponding to a ratio between Cl atoms and H atoms usually equal to or higher than 2.

Among the anhydrides useful to prepare the abovesaid prepolymers, the following are to be cited:

hexachloro-endomethylene-tetrahydrophthalic anhydride (chlorendic anhydride), of formula:

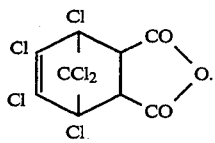

The corresponding radical T, in this formula and in the following formulas, is obtained by eliminating the anhydride function (—CO—O—CO—) from the formula.

phthalic anhydride:

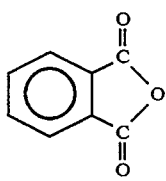

hexahydrophthalic anhydride:

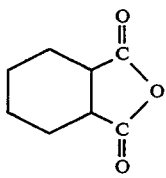

trimellitic anhydride:

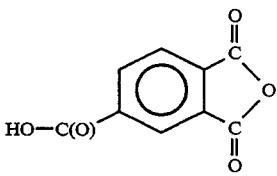

pyromellitic anhydride:

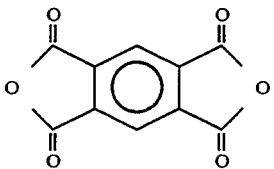

methyl-endomethyl-tetrahydrophthalic anhydride (methylnadic anhydride):

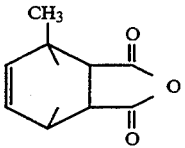

methyltetrahydrophthalic anhydride
2-dodecyl-succinic anhydride
tetrachlorophthalic anhydride.

Among the anhydride mixtures which are utilizable according to the present invention, it is possible to use the ones having an eutectic composition such as, for example, the eutectic mixture of chlorendic anhydride with hexahydrophthalic anhydride.

In the reaction between the perfluoropolyether diol (A) and the anhydride or anhydrides (B), the A/B molar ratio generally ranges from 1.0/0.5 to 1.0/3.0 and preferably from 1.0/1.5 to 1.0/2.0.

Depending on the value of the abovesaid A/B molar ratio, different mixtures of addition products are obtained.

The perfluoropolyether and fluoropolyether diols (XI) in which $n=0$ are known compounds. The ones corresponding to perfluoropolyethereal chain (V) are prepared as is described in Italian patent 903,446.

The diols in which $n=0$, corresponding to chain (VI) are obtained by reduction of the diacyl fluorides described in European patent application 148,482.

The diols in which $n=0$, corresponding to chain (VII) are obtained by the methods described in U.S. Pat. Nos. 3,847,978 and 3,810,874 starting from diacid fluorides described in U.S. Pat. No. 3,665,041.

The diols corresponding to chain (VIII) are prepared by the process described in European patent application 151,877.

The perfluoropolyether and fluoropolyether diols (I) in which n ranges from 1 to 5 are prepared by ethoxylation starting from the ones in which $n=0$. To this purpose it is possible to treat the diols in which $n=0$, at room temperature, with a sodium alkoxyde utilized in such amount as to form about 5–10% of alcoholate. Subsequently, the reaction products is treated with the desired amount of ethylene oxide at a temperature from 50° to 100° G., adding all the ethylene oxide in one portion or divided into several successive portions.

The value of "n" in the perfluoropolyether and fluoropolyether diols prepared by ethoxylation preferably ranges from 1 to 2.

The present invention contemplates also a second class of prepolymers comprising a perfluoropolyethereal or fluoropolyethereal chain and two functional end groups selected from two —COOH, or a —COOH and a —OH.

These prepolymers, which are new compounds, correspond to the formula:

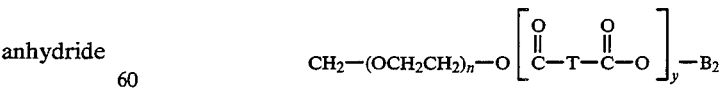

in which T, Q, x, y and n are the same as defined hereinbefore;

$B_1 = H$ or $[(CH_2)_z—C(O)—O]_{d^1}—H$.

$B_2 = H$ or $[(CH_2)_z—C(O)—O]_{d^2}—H$. in which z is an integer ranging from 3 to 11 and preferably from 3 to 7; $d^1$ and $d^2$, like or different from each other, are integers ranging from 0 to 8 and preferably from 0 to 4;

provided that only one out of $B_1$ and $B_2$ can be H and that the sum $d^1+d^2$ is equal to or higher than 1.

The prepolymers of said second class are prepared by reacting a prepolymer of the first class (adduct of a perfluoropolyether or fluoropolyether diol with an anhydride or more anhydrides) with a lactone containing 5 to 12 carbon atoms.

The reaction between the adduct and the lactone is usually conducted at temperatures ranging from 80° C. to 200° C. and preferably from 100° to 150° C.

The use of a solvent is optional. When a solvent is utilized, it is generally a solvent of perfluoropolyethers such as $CCl_2F$—$CClF_2$ or a mixture of such solvent with a ketone or an ester, for example the ones defined hereinbefore.

Preferably the lactone contains 5 to 8 carbon atoms.

The adduct/lactone molar ratio generally ranges from 1.0/0.5 to 1.0/5.0 and preferably from 1.0/1.0 to 1.0/3.0.

Another object of the present invention are new fluorinated epoxy resins prepared by cross-linking of known non-fluorinated epoxy prepolymers with one or more fluorinated cross-linking agents selected from the abovesaid first and second class and, optionally, with one or more known cross-linking agents not containing fluorine.

Generally, such resins contain from 1 to 15% by weight of fluorine. More usually, they contain from 1 to 10% thereof.

Among the known non-fluorinated epoxy prepolymers, there are to be cited, for example, the following ones:

prepolymers derived from bisphenol A and epichlorohydrin prepolymers derived from hydrogenated bisphenol A and epichlorohydrin epoxy prepolymers novolak based on cresol prepolymers derived from bisphenol F and epichlorohydrin prepolymers derived from bisphenol S and epichlorohydrin polynuclear prepolymers derived from phenol and glycidic ether tetraglycidyl-methylene-dianiline prepolymers triglycidyl isocyanurate prepolymers diglycidyl idantoine prepolymers prepolymers derived from epichlorohydrin and halogenated bisphenols such as, for example, tetrabromobisphenol A and tetrachlorobisphenol A cycloaliphatic prepolymers.

The non-fluorinated cross-linking agents optionally utilized as such are the known ones, in particular: annydrides of bicarboxylic or tetracarboxylic acids, polyfunctional amines, polyamides, polyaminomides (obtained from polyamines and dimers of fatty acids), polyphenols, polythiols, polycarboxylic acids and polyisocyanates. The cross-linking reaction is conducted according to the known processes. The reaction temperature ranges commonly from 80° C. to 200° C.

The cross-linking reaction can be conduced in bulk or with premixing, in solution, also as a function of the utilization which the cross-linked resin is intended for.

The reagents, which often are liquid, can be mixed, in many cases, without using solvents. If some of them are solid and/or if it is desired to carry out the reaction in solution, they can be dissolved in proper solvents, in particular esters (such as butyl acetate or amyl acetate), ketones (such as acetone and methylethylketone) and aromatic hydrocarbons (such as xylene and toluene); such solvents are optionally used in admixture with solvents of perfluoropolyethers, such as 1,1,2-trichlorotrifluoroethane.

For 100 parts by weight of epoxy prepolymers there are generally used 2 to 80 parts of fluorinated cross-linking agent and 0 to 80 parts of hydrogenated cross-linking agent.

Instead of using a single epoxy prepolymer, it is possible to use mixtures of such prepolymers.

To the mixture of epoxy prepolymer and cross-linking agent or agents it is possible to add known accelerators such as n-butyl imidazole, tris(dimethylaminophenyl)phenol, benzyldimethylamine, triethanolamine and dicyanamide.

Such accelerators are generally utilized in amounts ranging from 0.5 to 1% by weight referred to the epoxy prepolymer.

When polyisocyanates are used as hydrogenated cross-linking agents, it is possible to use known catalysts such as tin dibutyl dilaurate, tin dibutyl acetate, tin dibutyl oxide, iron acetylacetonate and titanium alcoholates (such as titanium tetraisopropylate).

Such catalysts are generally utilized in amounts of 0.001–2% by weight and preferably of 0.01–0.5% referred to the total of the components.

The mixture of epoxy prepolymer and cross-linking agent or agents can also contain other usual ingredients such as pigments and fillers, depending on the use which the cross-linked resin is intended for.

Another object of the present invention provide a particular process for preparing the epoxy resins conforming to the present invention which permits to obtain products having a very high flexural strain at break %.

This process comprises two steps. In the first step, an epoxy prepolymer is reacted with the fluorinated cross-linking agent in such conditions as to obtain a chain extension reaction: to this purpose, use is made of a catalyst of the reaction between carboxy groups and epoxy groups. Suitable catalysts are the ones utilized for the reaction between the CTBN (Carboxy Terminated Butadiene Nitrile) prepolymers and the epoxy prepolymers, in particular triphenylphosphine and the quaternary phosphonium salts, such as ethyltriphenylphosphonium iodide. In this step, the epoxy prepolymer is used in excess with respect to the fluorinated cross-linking agent. More exactly, the employed molar ratio between the former and the latter generally ranges from 2 to 20 and, more usually, from 2 to 6.

In the second step, an optional further amount of epoxy prepolymer and a non-fluorinated cross-linking agent are added to the reaction product of the first step, whereafter the cross-linking is carried out under the usual conditions.

The fluorinated epoxy resins conforming to the present invention exhibit mechanical and chemicophysical properties which are much higher than the ones of the non-fluorinated epoxy resins.

With respect to the fluorinated epoxy resins prepared starting from fluorinated epoxy prepolymers, the greatest improvement is obtained in the mechanical properties.

In particular, the fluorinated epoxy resins conforming to the present invention, besides possessing excellent mechanical properties, are characterized by:

high stability to hydrolysis, to chemical agents and to atmospherical agents high thermal stability
low refraction index
low wettability
high dimensional stability
self-lubricating properties
high oil repellency and high water repellency
anti-flame properties
low dielectric constant.

Thanks to their exceptional characteristics, the epoxy resins conforming to the present invention are utilizable in several applicative fields, for example as adhesives, high-performance structural and composite materials (for example for the aeronautical and electronic sectors), coatings for optical fibres and for magnetic tapes and discs, paints to be used in the aeronautical and aerospace sectors, and coatings for mechanical parts immerged in solvents and for metal structures subject to corrosion.

The following examples are given merely to illustrate the present invention and are not to be considered as a limitation of the invention.

EXAMPLE 1

Examples 1–6 refer to the preparation of adducts of perfluoropolyether diols with anhydrides.

In the present example, Fomblin$^{(R)}$Z DOL 2000 produced by Montefluos, of formula $$OH-CH_2-CF_2-(CF_2CF_2O)_m(CF_2O)_p-CF_2-CH_2OH \qquad (IX)$$

having an average molecular weight equal to 2,000, where m/p=1, was utilized as perfluoropolyether diol.

200 g (0.1 mole) of said diol were mixed with 55 g (0.15 mols) of chlorendic anhydride and were heated at reflux at 150° C. for one hour.

Obtained was a mixture of adducts corresponding to formula (XI), in which:

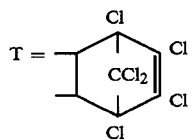

and n=0.

Such products were revealed by $^{19}F$ NMR analysis and $^1H$ NMR analysis.

EXAMPLE 2

There was utilized a perfluoropolyether diol Fomblin $^{(R)}$ Z DOL TX 2000, produced by Montefluos, of formula:

$$OH-(CH_2CH_2O)_n-CH_2-CF_2-O(CF_2-CF_2O)_m(CF_2O)_p-CF_2-CH_2-(OCH_2CH_2)_nOH \qquad (X)$$

having an average molecular weight equal to 2,000, in which m/p=1 and n=1.5.

220 g (0.1 mole) of said diol were mixed with 55 g (0.15 mole) of chlorendic anhydride and were heated at reflux at 150° C. for one hour.

Obtained was a mixture of adducts corresponding to formula (XI), in which Q and T are the same as defined in example 1 and n is equal to 1.5.

Such products were revealed by $^{19}F$ NMR analysis and $^1H$ NMR analysis.

EXAMPLE 3

200 g (0.1 mole) of Fomnlin Z DOL 2000 were mixed with 23 g (0.15 mole) of eutectic mixture of hexahydrophthalic anhydride with clorendic anhydride and were heated at reflux for one hour.

EXAMPLE 4

220 g (0.1 mole) of Fomblin Z DOL TX 2000 were mixed with 23 g (0.15 mole) of eutectic mixture of example 3 and were heated at reflux at 150° C. for one hour.

EXAMPLE 5

200 g (0.1 mole) of Fomblin Z DOL 2000 were mixed with 18 g (0.15 mole) of eutectic mixture of example 3 and were heated at reflux at 150° C. for one hour.

EXAMPLE 6

220 g (0.1 mole) of Fomblin Z DOL TX 2000 were mixed with 18 g (0.15 mole) of the same eutectic mixture of anhydrides of example 5 and were heated at reflux at 150° C. for one hour.

EXAMPLE 7

The adducts of examples 1–6 were reacted with ε-caprolactone using a ε-caprolactone/adduct molar ratio equal to 2. It was heated at reflux at 150° C.

The reaction products are defined as follows:

| adduct of the example | reaction product with ε-caprolactone |
|---|---|
| 1 | 7a |
| 2 | 7b |
| 3 | 7c |
| 4 | 7d |
| 5 | 7e |
| 6 | 7f |

EXAMPLE 8

Epoxy resins were prepared starting from various mixtures of:

a) an epoxy prepolymer based on bisphenol A (Epikote$^{(R)}$ 828 produced by Shell Inc.): 100 g b) the fluorinated cross-linking agent of example 2 or of example 7 (for comparative purposes, also a mixture free from fluorinated cross-linking agent was prepared)

c) a hydrogenated cross-linking agent: hexahydrophthalic anhydride (HHPA)

d) an accelerator consisting of benzyl dimethylamine (BDMA).

The nature of the components and their amounts (in parts by weight) are reported in Table 1.

After homogenization of the components by means of stirring, the mixtures were heated to 120° C. and maintained at this temperature for 24 hours.

TABLE 1

| Components | Resin E 1 | Resin E 2 | Resin E 3 | Resin E 4 | Resin E 5 |
|---|---|---|---|---|---|
| Epikote 828 | 100 | 100 | 100 | 100 | 100 |
| HHPA | 80 | 74 | 71 | 74 | 71 |
| BDMA | 1 | 1 | 1 | 1 | 1 |
| Cross-linking agent of ex. 2 | — | 10 | 25 | — | — |
| Cross-linking agent of ex. 7b | — | — | — | 10 | 25 |

TABLE 1-continued

| Components | Resin E 1 | Resin E 2 | Resin E 3 | Resin E 4 | Resin E 5 |
|---|---|---|---|---|---|
| Fluorine amount (% by weight) | 0 | 2.85 | 6.7 | 1.5 | 3.5 |

The mixtures of Table 1 were poured into little open molds of polytetrafluoroethylene, having the shape of reactangular recesses, exhibiting a length of 100 mm, a width of 12 mm and a depth of 3 mm. The cross-linking was carried out by heating at 120° C. for 24 hours, at 150° C. for 3 hours and at 180° C. for 1 hour.

The resulting samples were subjected to the following evaluations:

a) measure of the surface energy according to the Fowkes-Young method b) water absorption by immersion in boiling water during 8 hours, according to standard ASTM 570-81 c) flexural strength and flexural strain at break (%) according to standard ASTM D 790.

In order to evaluate the quality of the adhesion to metals, the various mixtures were spread between the opposed faces of two mild steel cylinders having a diameter of 1.5 cm and a height of 4 cm, which were then pressed on each other. The mixture layer was subjected to the cross-linking thermal cycle at 120° C., 150° C., and 180° C., as specified above. Subsequently, the parts of cylinders bound by means of the resins were subjected to a tension at a speed of 10 mm/min., and the break stress was measured. Such value was divided by the cylinder section, thereby obtaining the bond strength.

The results of the various tests are reported in Table 2.

TABLE 2

| Type of resin | E 1 | E 2 | E 3 | E 4 | E 5 |
|---|---|---|---|---|---|
| Flexural strength (MPa) | 68.1 | 105.3 | 98.7 | 111.5 | 102.4 |
| Flexural strain at break (%) | 2.4 | 4.2 | 4.8 | 4.1 | 4.9 |
| Water absorption at 100° C. (%) | 1.36 | 1.08 | 1.07 | 1.15 | 1.12 |
| Surface energy (mN/m) | 30.3 | 20.8 | 20.1 | 20.2 | 20.1 |
| Bond strength (MPa) | 32.5 | 55.4 | 41.3 | 43.0 | n.d. |

From an examination of Table 2 it is apparent that all the measured properties are much better in the case of the resins conforming to the present invention (E2, E3, E4, E5).

EXAMPLE 9

There were prepared, for comparative purposes, two epoxy resins starting from fluorinated epoxy prepolymers, hydrogenated epoxy prepolymers and hydrogenated cross-linking agents.

The fluorinated epoxy prepolymer was obtained by reacting the perfluoropolyether diol Z DOL 2000 having formula (IX) with epichlorohydrin, following the modalities described in example 7 of European patent application 212,319.

Two mixtures having the following compositions were prepared:

|  | Z 2 | Z 3 |
|---|---|---|
| Epikote 828 | 100 | 100 |
| Fluorinated epoxy prepolymer | 10 | 25 |
| HHPA | 74 | 71 |
| BDMA | 1 | 1 |

The mixtures were poured into the little open molds described in example 8 and were subjected to the cross-linking thermal cycle at 120°, 150° and 180° C. described in said example.

The flexural strength and the flexural strain at break % were determined as is described in example 8 and are compared in Table 3 with those of two resins (E2 and E3) conforming to the present invention.

TABLE 3

| Type of resin | Flexural strength (MPa) at break | Flexural strain at break (%) |
|---|---|---|
| E 2 | 105 3 | 4 2 |
| E 3 | 98 7 | 4 8 |
| Z 2 | 45 3 | 5 1 |
| Z 3 | 40 7 | 5 6 |

It can be noticed that the flexural strength at break much higher in the case of the two products conforming to the present invention.

EXAMPLE 10

25 parts of the cross-linking agent produced in example 7f were mixed with 100 parts of Epikote 828 and 1 part of triphenylphosphine. The mixture was reacted at 85° C. for 4 hours.

The reaction product was divided into two portions. To the first portion (A), Epikote 828 and HHPA, in a weight ratio of Epikote 828 to HHPA equal to 100/74, were added in such amount as to have 3.65% by weight of perfluoropolyethereal chain in the final mixture.

To the second portion (B), Epikote 828 and HHPA were added in the same ratio to each other, but in such amount as to have 5.62% by weight of perfluoropolyethereal chain in the final mixture.

Mixtures A and B were heated for 10 minutes at 120° C. under discontinuous stirring in order to completely solubilize HHPA and were then cooled to room temperature. 2 parts of BDMA were added and the mixtures were poured into the polytetrafluoroethylene molds described in example 8 and were cross-linked under the same conditions of example 8.

For comparative purposes, two samples C and D were prepared according to the procedure utilized for samples A and B, with the only exception that in the first step no triphenylphosphine was added, wherefore no pre-reaction occured in said step.

The flexural strength at break and the flexural strain at break (%) were then determined. The results are reported in Table 4 and are compared with the data of resin E1 (not conforming to the present invention and described in Table 1).

TABLE 4

| Type of resin | E1 not conforming to the invention | 10A with prereaction, 3.65% of perfluoropoly-ethereal chain | 10B with prereaction, 5.62% | 10C without pre-reaction, 3.65% | 10D without pre-reaction, 5.62% |
| --- | --- | --- | --- | --- | --- |
| Flexural strength at break (MPa) | 68.1 | 95.6 | 98.4 | 131.7 | 127.6 |
| Flexural strain at break (%) | 2.4 | 5.1 | 7.4 | 2.9 | 3.6 |

We claim:

1. A process for preparing fluorinated epoxy resins, said process comprising cross-linking at least one non-fluorinated epoxy prepolymer with at least one fluorinated cross-linking agent said fluorinated cross-linking agent having two functional end groups, selected from two carboxyl or one carboxyl and one hydroxyl, said fluorinated cross-linking agent having the formula:

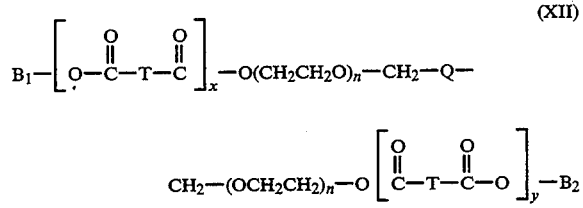

wherein Q is a perfluoropolyethereal or fluoropolyethereal chain having an average molecular weight ranging from 500 to 10,000, Q being selected from the group consisting of:

1)

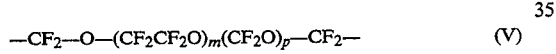

wherein units ($CF_2CF_2O$) and ($CF_2O$) are randomly distributed along the chain and m/p ranges from 0.2 to 2;

2)

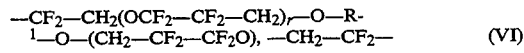

in which $R^1$ is a fluoroalkylene radical containing 1 to 10 carbon atoms and r/s ranges from 0.8 to 1.2;

3)

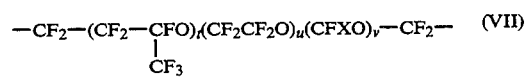

in which units

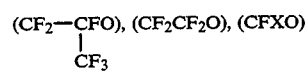

are randomly distributed along the chain,
X = F or $CF_3$,
t/u = 0.6–2.0, and
u/v is higher than 10; and

4)

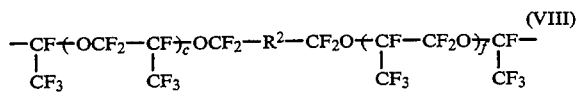

in which $R^2$ is a perfluoroalkylene radical containing 1 to
10 carbon atoms and c/f = 0.8–1.2;

T is a divalent aliphatic, aromatic, cycloalkylene or cycloalkene hydrocarbon radical optionally containing chlorine atoms, derived from an anhydride of a bicarboxylic or tetracarboxylic acid;

n ranges from 0 to 5;

x and y, like or different from each other, are equal to 0 or 1, provided that x+y is equal to 1 or 2;

$B_1$ = H or $[(CH_2)_z—C(O)—O]_{d^1}$—H
$B_2$ = H or $[(CH_2)_z—C(O)—O]_{d^2}$—H in which z is an integer ranging from 3 to 11;

$d^1$ and $d^2$, like or different from each other, are integers ranging from 0 to 8;

provided that only one out of $B_1$ and $B_2$ can be H and that the sum
$d^1 + d^2$ is equal to or higher than 1.

2. The process of claim 1, wherein said non-fluorinated epoxy prepolymer is cross-linked with at least one non-fluorinated cross-linking agent in addition to said fluorinated cross-linking agent.

3. The process of claim 1, wherein T is the radical:

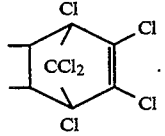

4. The process of claim 1, wherein n ranges from 1 to 2.

5. The process of claim 1, wherein the average molecular weight of Q ranges from 500 to 5,000.

6. The process of claim 1, wherein z ranges from 3 to 7.

7. A fluorinated epoxy resin prepared by the process of claim 1.

8. The fluorinated epoxy resin of claim 7, wherein said fluorinated epoxy resin contains from 1 to 15% by weight of fluorine.

9. A process for making an epoxy resin having a high flexural strain at break %, said process comprising:
   (a) reacting an excess of epoxy prepolymer with the fluorinated cross-linking agent of claim 1 in the presence of a catalyst for a reaction between carboxylic groups of the fluorinated cross-linking agent and epoxy groups of the epoxy prepolymer to form a first-step reaction product; and
   (b) adding a non-fluorinated cross-linking agent to said first-step reaction product.

10. The process of claim 9, wherein the epoxy prepolymer and the fluorinated cross-linking agent are reacted in step (a) in a molar ratio of the epoxy prepolymer to the fluorinated cross-linking agent of from 2:1 to 20:1.

11. The process of claim 9, wherein the catalyst is triphenylphosphine.

* * * * *